US006813581B1

(12) United States Patent
Snyder

(10) Patent No.: US 6,813,581 B1
(45) Date of Patent: Nov. 2, 2004

(54) STATISTICAL AND TREND ANALYSIS OF RAILROAD BEARING TEMPERATURES

(75) Inventor: Todd W. Snyder, Omaha, NE (US)

(73) Assignee: Union Pacific Railroad Company, Omaha, NE (US)

( * ) Notice: Subject to any disclaimer, the term of this patent is extended or adjusted under 35 U.S.C. 154(b) by 35 days.

(21) Appl. No.: 10/400,589

(22) Filed: Mar. 26, 2003

(51) Int. Cl.[7] .............................. G01K 1/00; G01K 1/08
(52) U.S. Cl. .................... 702/130; 702/179; 246/169 A; 374/141; 374/153
(58) Field of Search ..................... 702/130, 99, 136, 702/179; 374/4, 45, 101, 141, 153; 246/169 A

(56) References Cited

U.S. PATENT DOCUMENTS

| | | | |
|---|---|---|---|
| 4,491,290 A | 1/1985 | Douglas | 246/169 A |
| 4,960,251 A | 10/1990 | Nyman | 246/169 A |
| 5,060,890 A | 10/1991 | Utterback et al. | 246/169 A |
| 5,149,025 A | 9/1992 | Utterback et al. | 246/169 A |
| 5,201,483 A | 4/1993 | Sutnar et al. | 246/169 A |
| 5,331,311 A | 7/1994 | Doctor | 340/463 |
| 5,381,692 A | 1/1995 | Winslow et al. | 73/593 |
| 5,381,700 A | 1/1995 | Grosskopf, Jr. | 73/865.9 |
| 5,448,072 A | 9/1995 | Gallagher | 250/349 |
| 5,677,533 A | 10/1997 | Yaktine et al. | 250/342 |
| 6,271,761 B1 | 8/2001 | Smith et al. | 340/682 |
| 6,286,992 B1 * | 9/2001 | Kyrtsos | 374/45 |
| 6,373,394 B1 | 4/2002 | Zhang | 340/584 |
| 2001/0030466 A1 | 10/2001 | Ehrlich et al. | 303/191 |
| 2002/0051593 A1 | 5/2002 | Oka | 384/448 |
| 2002/0062694 A1 | 5/2002 | Ehrfeld et al. | 73/593 |
| 2002/0105429 A1 | 8/2002 | Donner et al. | 340/682 |

* cited by examiner

Primary Examiner—John Barlow
Assistant Examiner—Meagan S Walling
(74) Attorney, Agent, or Firm—Thomte, Mazour & Niebergall; Shane M. Niebergall

(57) ABSTRACT

A system is provided for tracking the wheel bearing temperatures of a train and selecting those that are statistically determined to be abnormally high, while eliminating from consideration, or otherwise categorizing those high temperature readings which are the result of other anomalous and non-anomalous conditions. The system determines the overall distribution of the bearing temperatures for both sides of a train at each wayside location. The bearing temperatures are ranked for comparison with the overall train distribution. Outliers are detected and characterized based on temperature patterns and previous history.

23 Claims, 4 Drawing Sheets

STATISTICAL AND TREND ANALYSIS OF RAILROAD BEARING TEMPERATURES

BACKGROUND OF THE INVENTION

1. Field of the Invention

The present invention relates to systems for analyzing bearing temperature measurements taken from moving trains by wayside measurement devices, and more particularly to a system of statistical and trend analysis of railroad bearing temperatures that improves detection of faulty bearings and reduces the incidence of false "hot box" alarms.

2. Description of the Prior Art

Bearing temperature measurements are routinely taken from trains as they pass wayside measurement devices, commonly known as "Hot Box Detectors." These measurements are indicative of bearing health and the risk of pending failure. Past use of measurements of this nature were severely limited by random and non-random braking events, differing train speeds, weather conditions, calibration errors, environmental effects (from dust, pollen, etc.), and the lack or non-use of resources to communicate these measurements to a datastore for their use in a more comprehensive manner. These limitations caused the applicable alarm levels of prior art systems to be set at artificially high temperatures in an attempt to limit the alarm notifications to pending bearing failures only. The artificially high alarm temperatures overlooked many statistically valid indicators of bearing problems for the purpose of allowing the operations of the railroad to continue without undue or excessive interruption on a day-to-day basis. However, they also allowed foreseeable failures to occur with major associated costs and delays.

Current hot box detectors typically provide an absolute alarm that is transmitted by radio when the temperature of a bearing exceeds an ambient temperature by a fixed value. Other alarm systems are available which identify bearings having a lower temperature than those above the fixed value. These systems make a fixed-difference comparison of a car average, or car-side average, to each of the single bearings on the car or to one side of the train. In some cases, the standard deviation has also been used as a measure of comparative health of the bearings. However, the problem with reducing the absolute fixed value or by adding additional comparison alarms that are more sensitive to lower temperatures is that the number of alarms increase greatly, which negatively affects railroad operations. The number of trains stopped due to these alarms may be five times higher than the number of trains later verified to be suffering from pending bearing failures. This is due to the large number of false alarms generated by current systems. False alarms include those alarms that are caused by: heat that is transmitted from the wheel brakes to the bearings; sun reflections; obscured sensor lenses; and other anomalous conditions or electrical problems. In addition, 20% to 40% of those bearings verified by human inspection as being "overheated" are later disassembled and determined by experts to have been falsely removed with no indications of heat or mechanical problems.

The ability to communicate all of the measured temperatures to a central or manned location is a common option for current detectors. This has provided the opportunity for further processing of the data to better analyze problems that are detected.

The exact locations of alarmable defects is currently given by an axle location, which is then manually counted from the leading end of the train. Some detectors now have integrated AEI detectors that improve equipment identification and bearing location. However, these stand-alone integrated devices are costly and still cannot resolve the other shortcomings in current hot box detection.

Accordingly, what is needed is a system for the accurate detection of bearing failures that virtually eliminates unnecessary train stops.

SUMMARY OF THE INVENTION

The system of the present invention tracks individual train wheel bearing temperatures and selects those that are statistically determined to be abnormally high, while eliminating from consideration, or otherwise categorizing those high temperature readings which are the result of other anomalous conditions. The system determines the overall distribution of the bearing temperatures for both sides of each train at each wayside location. The bearing temperatures are then ranked for comparison with the overall train distribution. Outliers are detected and characterized based on temperature patterns and previous history. Information compiled by the system is then displayed in such a manner that appropriate action can be taken.

The present system also enhances the automated equipment identification system through the use of hot box detector axle spacing data and car bearing temperature patterns.

Accordingly, one of the principal objects of the present invention is to provide an improved system for analyzing temperature data from the wheel bearings of trains.

Another object of the present invention is to provide an improved system for analyzing temperature data from the wheel bearings of trains using existing temperature detection systems.

A further object of the present invention is to provide a system for enhancing the existing automated equipment identification system.

Still another object of the present invention is to provide an improved system for statistically detecting wheel bearings having abnormally high temperatures or abnormally large changes in temperature.

A further object of the present invention is to provide an improved system for the detection of abnormally hot bearings while identifying and categorizing high temperature readings that are a result of non-emergency conditions.

These and other objects will be apparent to those skilled in the art.

DESCRIPTION OF THE PREFERRED EMBODIMENT

Figure 1:
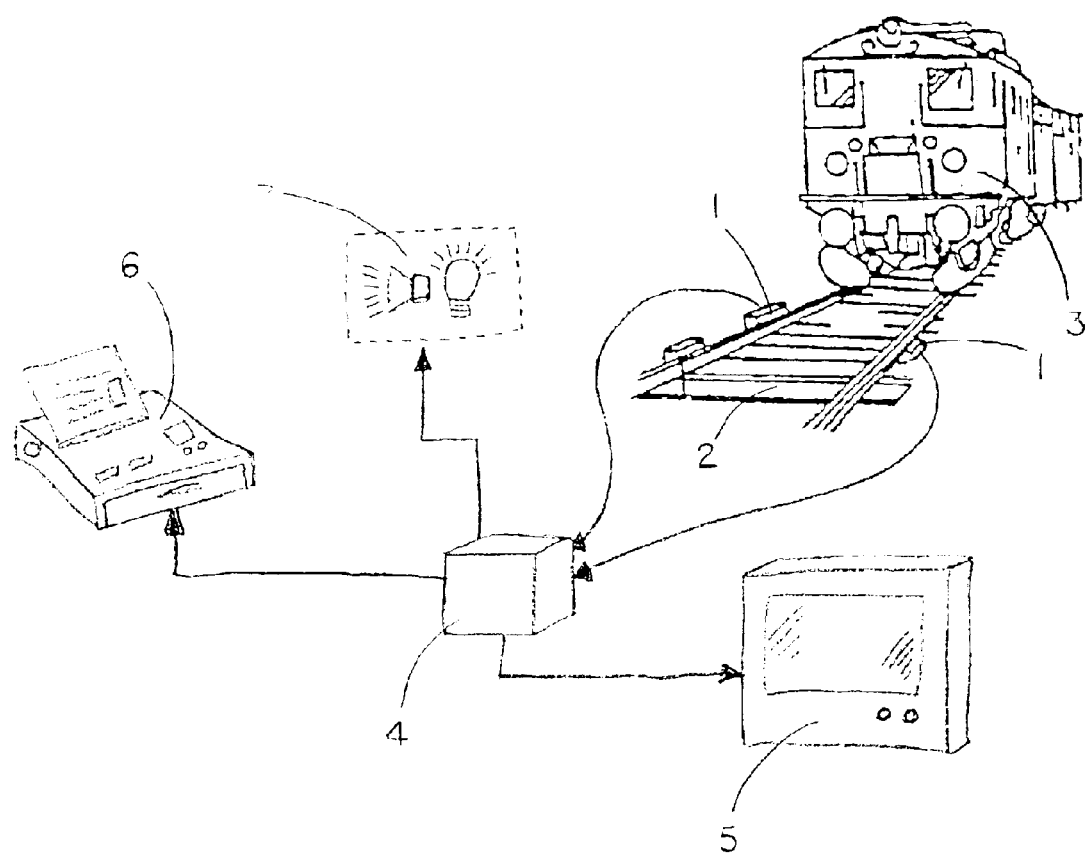
FIG. 1 depicts a general prior art system for detecting the temperatures of train wheel bearings.

FIG. 1 discloses a system that is known to the railroad industry. A plurality of bearing temperature detectors 1 are positioned adjacent both sides of a set of tracks 2. As the train 3 passes the detectors 1, the temperature data received is transmitted to a computer 4. The computer 4 is typically programmed to respond to temperature readings that are above a preset limit by sending alarm information to a monitor 5, a printer 6, or an audible or visual alarm system 7. The present invention is operable on systems such as that depicted in FIG. 1 and others similar thereto. For example purposes only and not by way of limitation, the present invention will be described as the same may be incorporated with the system depicted in FIG. 1.

The system 10 of the present invention makes use of temperature data received by existing or future hot box detectors 1 or other rail-side sensing devices that would be capable of detecting the temperature of a train's wheel bearings. The temperature data is transmitted to the central computer 4, which is provided with a memory means, such as a hard drive or other storage medium including a floppy, zip, CD or other such "diskette." A processor is provided in operative communication with the memory means for performing tasks, as dictated by the software of the present invention as follows.

Figure 2:
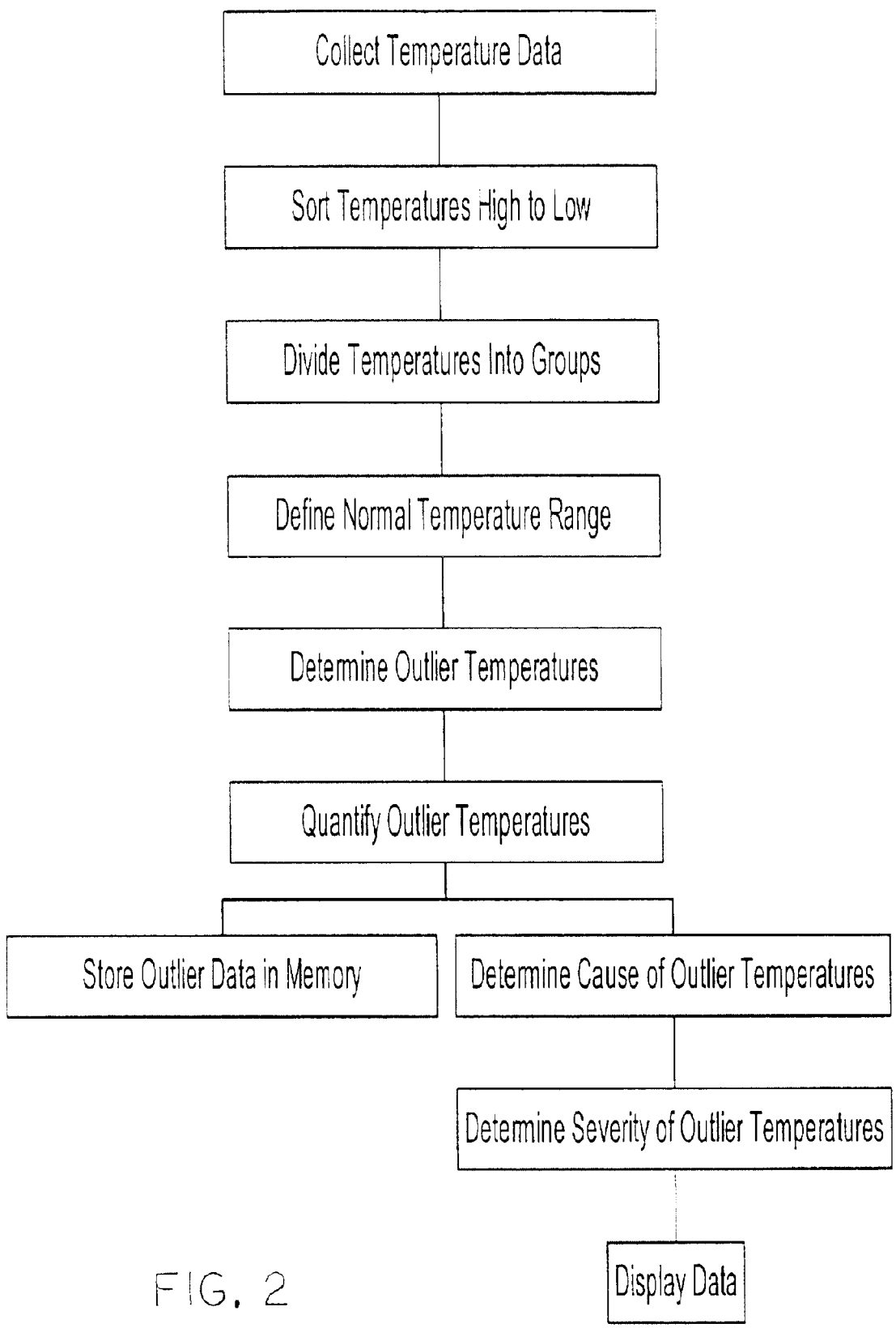
FIG. 2 depicts a block diagram of one embodiment of the method of the present invention.

FIG. 2 depicts a block diagram of an embodiment of the system 10. The temperature data is received by the computer 4 and, if desired, stored within the memory of the system 10. The description of the overall bearing distribution for a train side is then made by ranking each of the temperatures received from highest to lowest and then grouping this temperature data into at least three groups. The first group is preferably comprised of the lowest of the temperature readings, the third group is comprised of the highest of the temperature readings, and the second group is comprised of the middle range of temperature data. It is contemplated, however, that the number of groupings could be increased in order to decrease the size of the highest and lowest temperature data groupings. The groupings assist in the determination of temperature ranges; for example, where four groups are used, the groups determine the quartile division temperatures (e.g., if 25% of temperatures are below 50° and 25% of the temperatures are above 100°, then the first quartile [Q1] division temperature is 50°, and the third quartile [Q3] division temperature is 100°).

Figure 3:
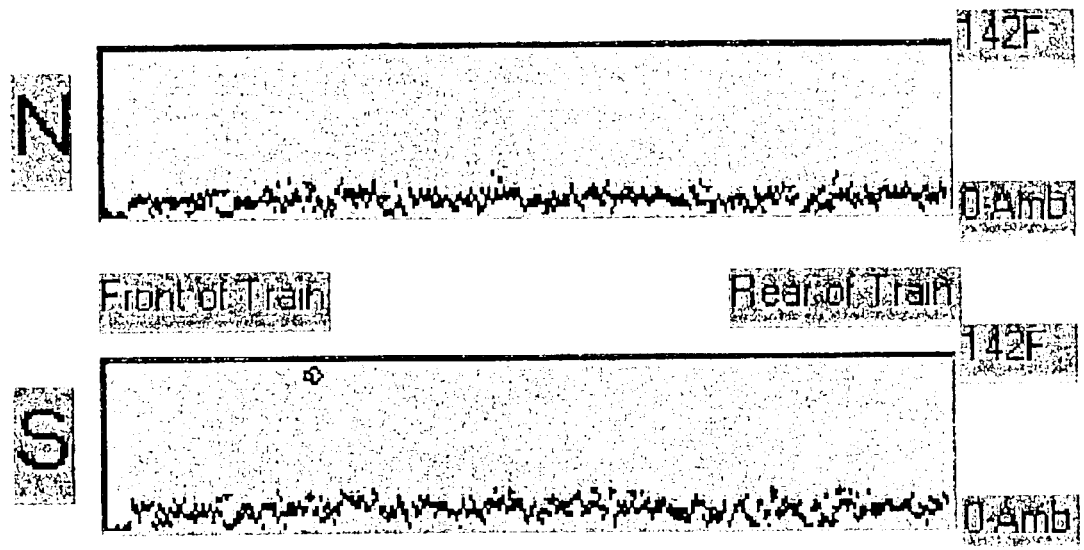
FIG. 3 depicts one embodiment of a graphical representation of temperature data exhibiting a stand-alone hot bearing.

A temperature "outlier" is a temperature measurement that lies somewhere above or below the normal range of temperatures. The group, or groups, of temperature data between the highest and lowest groups of temperate data typically represent the "normal range" of temperatures. Most of the temperature measurements above [Q3] will be less than [Q3+C[Q3−Q1]], where [C] is a constant chosen to differentiate between normal and abnormal temperatures. A value of [C] can be calculated to give a quantitative measure for each outlier. The use of fixed numerical constants (3, 2, 1, etc.) represents a quantitative measure for an overall condition of the train. Accordingly, the description of the temperature distribution for a train can be presented as an array of counts that lie above different constants (C1, C2, C3 . . . ). For example, if there are no temperatures above [Q3+1{Q3−Q1}], then the train could be characterized as having no outliers above the level C=1. An array of counts of this nature provides a useful description of the train's bearing temperature distribution. For example, a train may have temperature readings that, once analyzed, reveal that at C=3 there is a count of one bearing with a temperature above that level; at C=2 there are none; at C=1 there are two; and at C=0.5 there are nine. Accordingly, when the array of constants is C=[3,2,1,0.5] the outlier description for the train is [1,0,2,9]. Based on this description and a similar description for the opposite side of the train, the health of the detector, the overall train braking condition, and/or the overall distribution of bearings for the train can be estimated. For most trains that do not generate a significant amount of heat while braking (and that pass good operating detectors), good differentiation is seen at an approximate C value of 1.5. Preferably, the outlier data is graphically displayed in a manner similar to that depicted in FIG. 3 and is stored within the memory of the system 10. Varying combinations of arrays based on this methodology and other standard statistical functions are used to define the outlier conditions.

Figure 5:
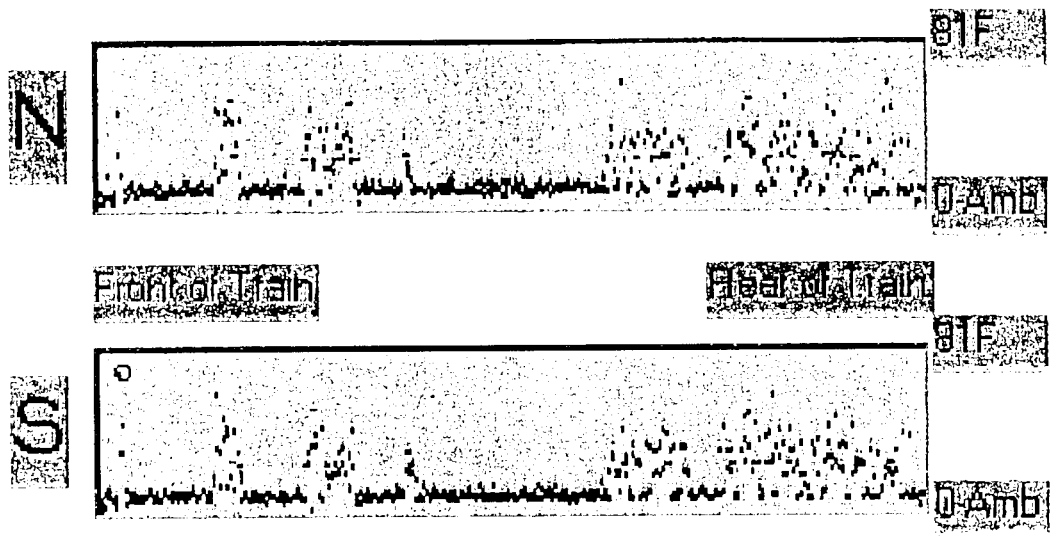
FIG. 5 depicts one embodiment of a graphical representation of temperature data exhibiting an air-braking event.

The tradeoffs between bearing burnoff risk reduction and operational impediment is made by filtering out high temperature readings caused by conditions other than faulty bearings. If a freight car truck has multiple wheels that are targeted as outliers, the vast majority of those will be the result of heat from braking, which could be graphically displayed by the system 10 as shown in FIG. 5. Therefore, the alarms from those situations can be suppressed without a significant risk of coincidental bearing heat indicative of impending failure. The same is true for those multiple alarms caused by other erroneous factors. However, these non-bearing alarms are preferably captured and stored within the memory of the computer 4 for the ongoing management and maintenance of issues, including excessive braking heat and detector malfunctions. The methods for filtering conditions are based on the same logic as stated previously.

Figure 4:
FIG. 4 depicts one embodiment of a graphical representation of temperature data exhibiting a car with a braking problem.
Figure 6:
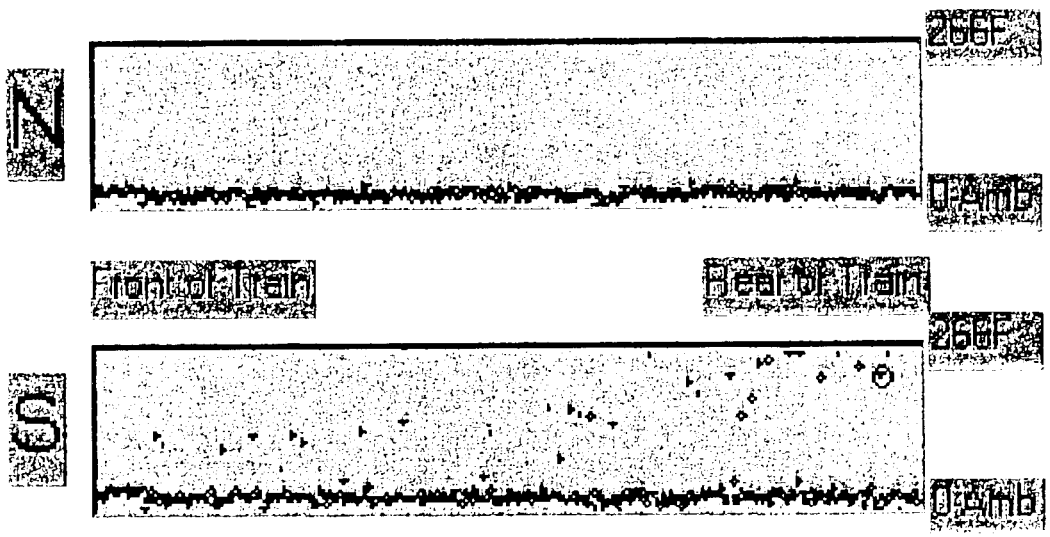
FIG. 6 depicts one embodiment of a graphical representation of temperature data exhibiting a detector error.

Many of the non-bearing alarms are indistinguishable from accurate bearing alarms and the typically high number of such alarms is unfavorable for operations. Accordingly, the history of the bearings is preferably used in order to provide a background or texture to the current reading. Since the current fixed threshold process for immediate notification by radio to the train is in place, it is possible to ignore most single-site outlier alarms. A second-site corroborating outlier alarm for a particular bearing will then ensure that detector malfunctions or site-specific malfunctions, which could be graphically displayed by the system 10 as shown in FIG. 6, are not causes for undue operational impediment. This leaves only heat that is occurring locally to a single bearing as a cause for improper categorizing of a faulty bearing. Such a defect is commonly due to a missing brake shoe or burnt-in brake head, which could be graphically displayed by the system 10 as shown in FIG. 4. However, these defects are high-risk problems of a similar magnitude as hot bearings, making them important to detect and remedy. Outliers are also addressed on their first alarm if historical data corroborates other scenarios such as a rate of temperature change that is unlikely to be caused by braking. Other non-outliers are also addressed when they are consistently ranked as the poorest performers with respect to overall train health, fleet health, or with other logical groupings.

Preferably, the data processed by the system 10 is displayed or presented in a manner in which appropriate action can be taken. Such a display may take the form of actionable alarms, which should be generated with all pertinent graphical support and tools necessary to manually verify or investigate the computer-derived directive. Alarms are communicated automatically from the computer 4 to the necessary systems and personnel via displays such as a monitor 5, a printer 6 or an audible or visual alarm system 7. It is contemplated that the display of information could include: a listing of quantified outliers with recommended actions; graphical representations of bearing temperatures (such as the examples depicted in FIGS. 3, 4, 5 and 6); a summary of actions taken and feedback concerning those actions; historical data relating to current outlier temperatures; a list of all pertinent data sets relating to the bearing temperatures received; a list of detectors having high failure rates; and a listing of relevant Automatic Equipment Identification data sets. It is further contemplated that the information display could include other data sets, such as wheel impact, repair history, etc. Any and all of the above information (although clearly not an exhaustive list) could be easily and clearly displayed on a monitor 5, by a printer 6, or other known display means and used as part of the actionable criteria.

The tracking of primary and secondary actions and results are preferably logged within the system's memory, along with the relevant timestamps, identifications, and priorities. Defined or undefined alarms are augmented by wheel impact loading histories, truck performance histories, and other performance data which can be stored by the system or accessed remotely, to allow for further analysis or manual intervention. Each hot box site can also be continually monitored by the system 10. It is preferred that a summary of site problems is presented with relevant information for characterization of defects for the site or for the characterization of problems occurring at the site which may be emanating from train operating conditions at that geographical location. All such data can be stored within the system 10 and made available with all graphical support and tools necessary to retrieve historical information when required. It is also contemplated that maintenance records could be integrated with the memory of system 10 to allow for the diagnosis of anomalies caused by factors such as newly applied bearings that are in their break-in period. Various look-up tables could also be made available in order to speed the automated or manual notification processes.

It is crucial to quickly and accurately direct field personnel to the exact location of the problem along the train. Although counting the axles from the front of the train is more than 95% accurate, such information is not easily implemented by field personnel, who must typically walk for a mile or more to a specific location in poor lighting and weather conditions. Moreover, any wasted travel time allows heat evidence in the system to dissipate, rendering a physical inspection useless. Identifying the equipment by symbol and number, along with the exact wheel location, is of great assistance in accurately describing the location of the problem. This information is combined with a defect report from AEI (automatic equipment identification) data, when that data is current and accurate and when the axle count of the train from the hot box detector system is a match. However, this is not the case in a significant percentage of incidents. In some cases, one or more cars have been removed from or added to the train at an unknown location along the length of the train. In some cases, the wheel pickup has malfunctioned on the hot box system and has not recorded a one or more sets of axle data or has erroneously added axle data.

An algorithm is preferably used to determine which cars were removed or added and what the correct set of axles looks like. This can be done in two ways. First, the time spacing between axles is used to determine the correct equipment, car, truck, and axle pattern definition. This information can be augmented by a comparison to prior hot box and AEI data. Another algorithm is preferably provided for correcting speed variances to get an actual distance spacing or a speed normalized time pattern. In cases where the axle spacings are significantly different from car to car, this information can also be used to determine positions where cars have been removed or added to the train. Secondly, the temperature distribution for a train or any individual piece of equipment, can be used to determine the same information. This "fingerprint" data may also be used for the purpose of making a distinction between trains having nearly identical equipment axle spacings or in determining cars added to or removed from the train. Both of these data sets can be used to then feed back into the AEI system or other system to update train records accordingly. This allows for the precise determination of train location and identification in geographic areas where systems of tracking hardware or signals are not available or are not sufficiently reliable. These benefits are available with minimal expense and require no additional AEI devices or other hardware for train location and identification purposes.

In the drawings and in the specification, there have been set forth preferred embodiments of the invention; and although specified items are employed, these are used in a generic and descriptive sense only and not for purposes of limitation. Changes in the form and proportion of parts, as well as substitution of equivalents, are contemplated as circumstances may suggest or render expedient without departing from the spirit or scope of the invention as further defined in the following claims.

Thus, it can be seen that the invention accomplishes at least all of its stated objectives.

I claim:

1. A system for analyzing temperature data received from the wheel bearings of trains, comprising:

a processor;

software operative on said processor for sorting the temperature data into at least a first grouping of temperature data, a second grouping of temperature data, and a third grouping of temperature data; said first group of temperature data comprising temperatures lower than temperatures grouped in said second grouping of temperature data and said third grouping of temperature data; said third grouping of temperature data comprising temperatures higher than the temperatures in said second grouping of temperature data;

said software being further operative on said processor for determining the highest temperature within said first grouping of temperature data and determining the lowest temperature within said third grouping of temperature data;

said software being further operative on said processor for detecting temperature outliers within said temperature data;

and means operatively coupled to said processor for displaying information relating to said temperature outliers.

2. The system of claim 1 wherein said first grouping of temperature data and said third grouping of temperature data are comprised of a relatively equal number of the temperature data.

3. The system of claim 1 wherein said first grouping of temperature data is comprised of approximately the lowest 25 percent of the temperature data.

4. The system of claim 2 wherein said third grouping of temperature data is comprised of approximately the highest 25 percent of the temperature data.

5. The system of claim 1 wherein said software is further operative on said processor for calculating an outlier quantifier for said temperature outliers detected within said temperature data.

6. The system of claim 5 wherein said outlier quantifier is calculated by dividing the temperature difference between at least one of said temperature outliers in said third grouping of temperature data and said lowest temperature within said third grouping of temperature data by the difference between said lowest temperature within said third grouping of temperature data and said highest temperature within said first grouping of temperature data.

7. The system of claim 5 wherein said outlier quantifier is calculated by dividing the temperature difference between at least one of said temperature outliers in said first grouping of temperature data and said highest temperature within said first grouping of temperature data by the difference between said lowest temperature within said third grouping of temperature data and said highest temperature within said first grouping of temperature data.

8. The system of claim 1 wherein said software is further operative on said processor for determining an identity of the train.

9. The system of claim 1 wherein said software is further operative on said processor for identifying a location on the train from which said temperature outliers are detected.

10. The system of claim 1 further comprising memory means operatively connected to said processor for storing data relating to said temperature outliers as historical data.

11. The system of claim 10 wherein said software is further operative on said processor for storing the temperature data within said memory means as historical temperature data.

12. The system of claim 10 wherein said software is further operative on said processor for comparing the temperature data to said historical temperature data.

13. The system of claim 1 wherein said software is further operative on said processor for determining a cause of said temperature outliers.

14. The system of claim 1 wherein said software is further operative on said processor for determining a level of severity for said temperature outliers.

15. A method of analyzing temperature data received from the wheel bearings of trains, comprising the steps of:

provuding a processor, software that is operative on said processor, and display means operatively coupled to said processor for displaying information;

sorting the temperature data into at least a first grouping of temperature data, a second grouping of temperature data, and a third grouping of temperature data; said first grouping of temperature data comprising temperatures lower than temperatures grouped in said second grouping of temperature data and said third grouping of temperature data; said third grouping of temperature data comprising temperatures higher than the temperatures in said second grouping of temperature data;

determining the highest temperature within said first grouping of temperature data and the lowest temperature within said third grouping of temperature data;

detecting temperature outliers within said temperature data; and displaying information relating to said temperature outliers on said display means.

16. The method of claim 15 further comprising the step of providing memory means operatively coupled to said processor for storing the temperature data and said temperature outliers as historical data.

17. The method of claim 15 further comprising the steps of calculating an outlier quantifier for said temperature outliers detected within said temperature data.

18. The method of claim 17 wherein said outlier quantifier is calculated by dividing the temperature difference between at least one of said temperature outliers and said lowest temperature within said third grouping of temperature data by the difference between said lowest temperature within said third grouping of temperature data and said highest temperature within said first grouping of temperature data.

19. The method of claim 17 wherein said outlier quantifier is calculated by dividing the temperature difference between at least one of said temperature outliers in said first grouping of temperature data and said highest temperature within said first grouping of temperature data by the difference between said lowest temperature within said third grouping of temperature data and said highest temperature within said first grouping of temperature data.

20. The method of claim 15 further comprising the step of determining an identify of the train.

21. The method of claim 15 further comprising the step of identifying a location on the train from which said temperature outliers are detected.

22. The method of claim 15 further comprising the step of determining a cause for said temperature outliers.

23. The method of claim 15 further comprising the step of determining a level of severity for said temperature outliers.

* * * * *